Figure 1:
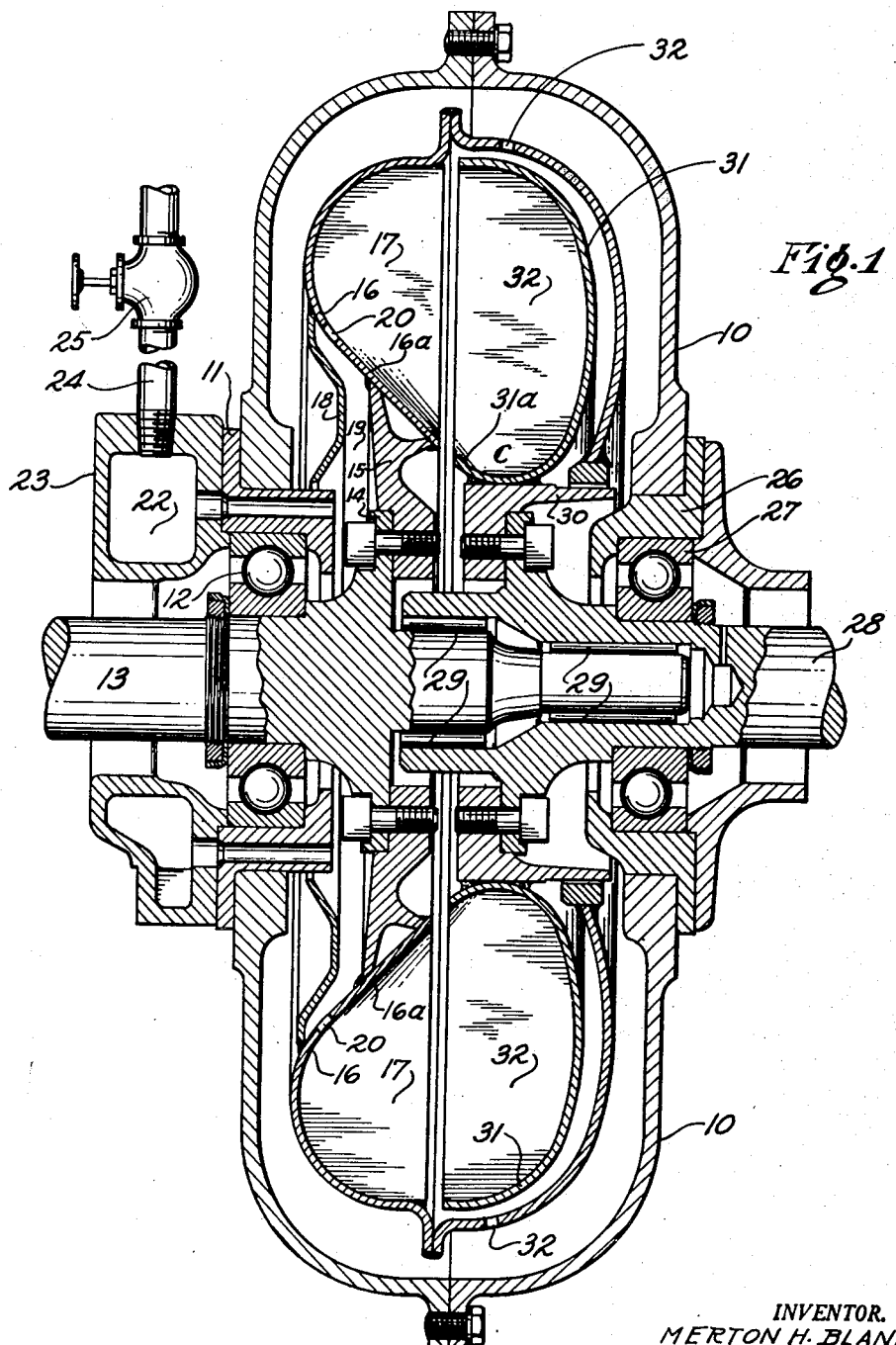

Patented July 31, 1951

2,562,657

UNITED STATES PATENT OFFICE 2,562,657

ROTARY TURBINE-TYPE FLUID COUPLING

Merton H. Blank, Detroit, and Gilbert E. Nelson, Holly, Mich., assignors to Liquid Drive Corporation, Holly, Mich., a corporation of Michigan Application January 29, 1946, Serial No. 644,100

5 Claims. (Cl. 60—54)

This invention relates broadly to hydraulic couplings of the kinetic (Föttinger) type and more specifically to improvements in the configuration of the portion of the impeller and driven members that define the vortex of the hydraulic circuit.

The most objectionable operative characteristic common to hydro-kinetic couplings heretofore constructed resided in the rotational instability of the driven member during low speed, high slippage operation of the couplings. Such instability or chattering of the driven member resulted from fluctuation of the stream of fluid circulating in the vortex ring of the coupling during high slippage. Various expedients, such as baffles between the driving and driven elements of the coupling, have been proposed from time to time as remedial of the low-speed chattering; but the proponents of such expedients universally failed to recognize that the vortex circulation must be maintained under conditions of high slippage. This is provided in the present invention by the configuration of the impeller housing and blades to form a smaller and shorter vortex circuit during high slippage operation while not affecting the shape and characteristics of the vortex ring during stabilized operation with low slippage.

In addition to the foregoing object, the invention further comprehends a structure which will stabilize the rotative movement of the driven member throughout the entire range of operation, a structure which is economic of manufacture, and a coupling in which the circulatory system is balanced during periods of acceleration or deceleration.

Other objects and advantages more or less ancillary to the foregoing and the manner in which all the various objects are realized will appear in the following description, which considered in connection with the accompanying drawings, sets forth the preferred embodiment of the invention.

Figure 2:
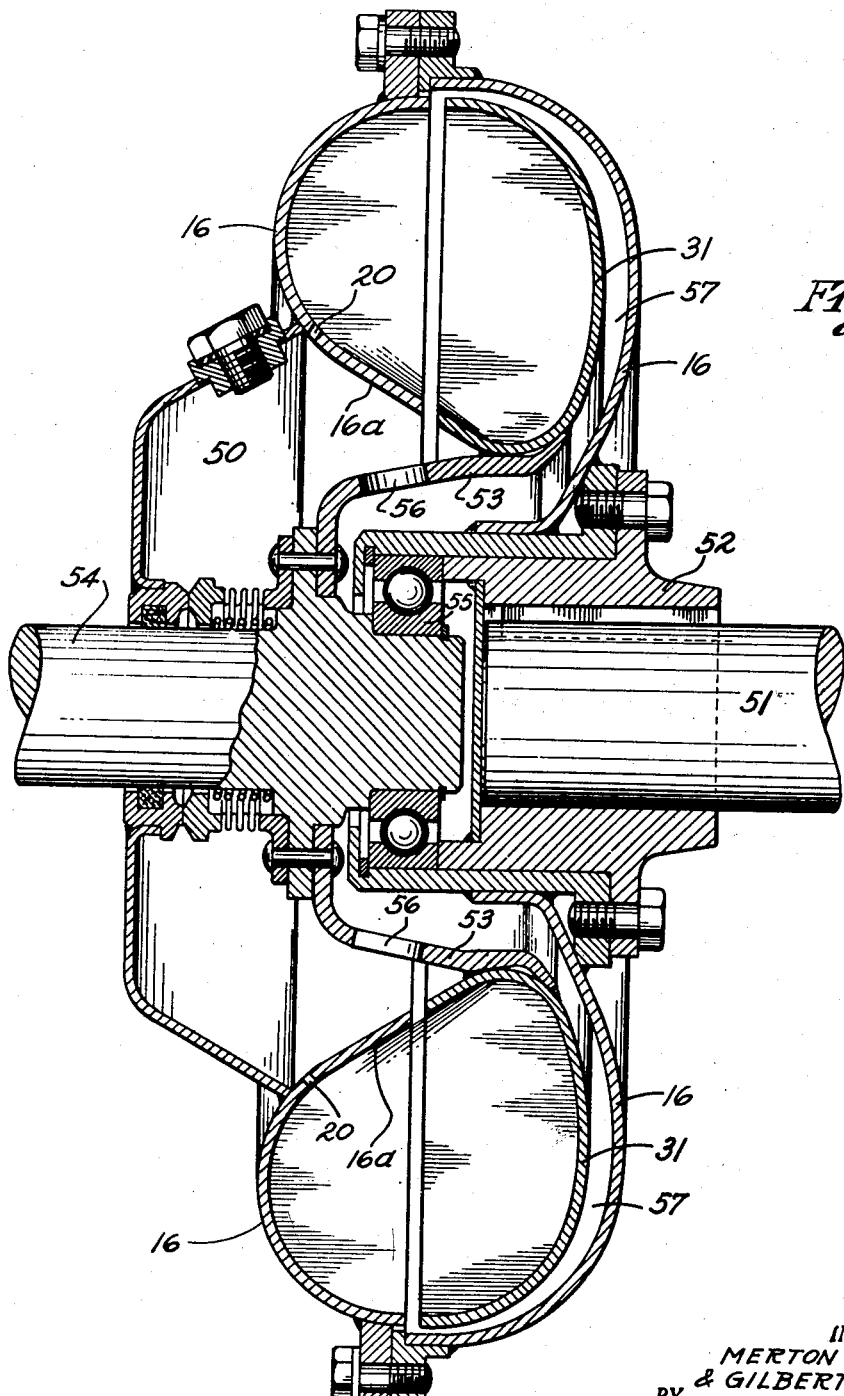

Referring to the drawings:

Fig. 1 is a vertical section through a hydraulic coupling embodying the present invention illustrating the type of coupling in which the fluid volume is varied, and Fig. 2 is a similar section through a constant volume type of coupling.

Referring first to Fig. 1, the coupling comprises a housing 10 bored to receive a ring 11 which in turn is bored for the reception of an anti-friction bearing 12 supporting a drive shaft 13. The inner end of the drive shaft is formed with a flange 14 having an annular plate 15 mounted thereon which supports a hollow shell 16 constituting an impeller of toroidal configuration. The shell is provided with a plurality of radial vanes 17 and is formed with a side wall of straight cross section which is inclined inwardly towards the plane of rotation of the toroidal body. The outer wall of the impeller adjacent the inclined face thereof is provided with an annular plate 18 which defines a passageway 19 communicating with ports 20 in the side wall of the impeller and further communicating with a passage chamber 22 in a housing 23 affixed to the housing 10. The housing 23 is drilled and tapped for the reception of a conduit 24 communicating with a source of fluid under pressure which is controlled by a valve 25. The housing 10 is further bored to receive a ring 26 machined for the reception of an anti-friction bearing 27 which supports an output shaft 28. The inner end of the output shaft is bored to form a race for bearings 29 for the support of the end of the shaft 13. The inner end of the shaft 28 is flanged to receive a ring 30 having a half shell of hemi-toroidal configuration thereon which constitutes the driven member or runner 31. The shell is provided with radial vanes 32 which, like the vanes 17, are disposed in spaced radial relation within the shell in the manner customary in hydro-kinetic couplings of this type. The outer circumferential wall of the runner is of semi-circular cross-section and similar in shape and size to the outer circumferential portion of the impeller. The inner circumferential wall of the runner, however, is generated from a radius of shorter length than that of the radius of the outer circumferential wall of the runner. The central wall of the runner is flared outwardly from the point of contact of the runner with the disk 30 thus forming a toroidal chamber in the center of the runner. The inclined face of the impeller terminates in contiguous relation with the free end of the wall defining the central wall of the runner.

In operation the working fluid passing through the conduit 24 and regulated by the valve 25 is admitted to the interior of the impeller through the openings 20 where it is thrown, under the influence of centrifugal force, to the outer circumferential portions of the impeller and runner, a portion thereof escaping through a port 32 to the interior of the housing 10.

The low slippage operation of this coupling follows known principles. When the slip is low, the centrifugal force urging the oil away from the axis of the coupling is high and the rate of rotation of the fluid within the torus is low; therefore the fluid tends to accumulate in the outer portion of the casing and circulate in the usual manner, since the portion of the casing more remote from the axis than the conical portion 16a is of conventional shape. When the amount of fluid in the coupling is reduced to obtain a reduced output speed and thus high slip, the velocity of rotation of the oil within the torus becomes high, and the oil thus tends to follow closely the walls of the impeller and runner. Under these conditions of operation, previously known couplings are unstable. With the coupling elements formed as shown in Fig. 1 with the inner lip of the runner directed outwardly, and the inner portion of the impeller conically formed and disposed as a tangent to the curve of the inner portion of the runner, smooth operation of the coupling is obtained. This observed fact is believed to be due to the conformity of the outline of the coupling shell to a natural path of flow of the oil around the torus, resulting in even flow of oil, and thus in even torque. During high slippage operation, the oil becomes uniformly distributed adjacent the walls of the torus, leaving a void in the center, and does not accumulate and flow unevenly.

Referring now to the embodiment illustrated in Fig. 2, the coupling is of the closed circuit type, that is, a coupling having a predetermined volume of fluid is enclosed within a chamber 50 which communicates with the interior of the impeller 16 through a series of openings 20. The impeller is driven from an input shaft 51 keyed or otherwise secured upon a hub 52 having the toroidal shell of the impeller 16 welded or otherwise secured thereon. The runner is welded or otherwise affixed to a drum 53 mounted on the flanged portion of an output shaft 54 which is supported in an anti-friction bearing 55 mounted in a seat in the hub member 52. The drum 53 is formed with an opening 56 for the admission of fluid in the chamber 57 defined by the spaced walls of the impeller 16 and runner 31. The configuration structure and function of the inner circumferential wall of the runner and inclined side wall 16a of the impeller are the same as that described above with reference to Fig. 1.

Although the foregoing description is necessarily of a detailed character, in order that the invention may be completely set forth, it is to be understood that the specific terminology is not intended to be rstrictive or confining, and that various rearrangements of parts and modifications of detail may be resorted to without departing from the scope or spirit of the invention as herein claimed.

What we claim is:

1. A hydraulic coupling comprising a runner and an impeller coaxial therewith, the runner and impeller being opposed at a median plane of separation of the coupling substantially perpendicular to the axis of rotation of the coupling and defining a hydraulic circuit of unbalanced proportions with the greater portion of the volume thereof in the runner to accommodate shifting of the fluid during high-slip operation, the radially outer portions of the runner and impeller being substantially symmetrical, and the radially inner portion of the runner extending closer to the axis than the impeller to provide greater volume, the outlet portion of the runner and inlet portion of the impeller defining a conical surface diverging into the impeller across the said plane of separation.

2. A hydraulic coupling comprising a runner and an impeller coaxial therewith, the runner and impeller being opposed at a median plane of separation of the coupling substantially perpendicular to the axis of rotation of the coupling and defining a hydraulic circuit of unbalanced proportions to accommodate shifting of the fluid to the runner during high-slip operation, the radially outer portions of the runner and impeller being substantially symmetrical, and the radially inner portions of the runner extending closer to the axis than the impeller to provide greater volume in the runner, the outlet portion of the runner and inlet portion of the impeller defining a surface diverging into the impeller across the said plane of separation.

3. A hydraulic coupling comprising an impeller and a runner, the shells thereof defining a generally toroidal fluid circuit, the impeller and runner facing each other at a plane of separation substantially perpendicular to the axis of rotation of the coupling and substantially equidistant from the back walls of the impeller and runner shells, the back and radially inner portion of the runner shell extending closer to the axis of the coupling than the outlet from the runner and the discharge portion of the runner flaring from the axis, the radially inner portion of the impeller shell being directed outwardly from the axis so as to constitute a conical inlet portion conforming to the direction of the discharge portion of the runner.

4. A hydraulic coupling comprising an impeller and a runner, the shells thereof defining a generally toroidal fluid circuit, the impeller and runner facing each other at a plane of separation substantially perpendicular to the axis of rotation of the coupling and substantially equidistant from the back walls of the impeller and runner shells, the back and radially inner portion of the runner shell extending closer to the axis of the coupling than the outlet from the runner and the discharge portion of the runner flaring from the axis, the radially inner portion of the impeller shell being directed outwardly from the axis so as to constitute a conical inlet portion conforming to the direction of the discharge portion of the runner, the volume of the runner being thus greater than that of the impeller to accommodate shifting of the bulk of the fluid into the runner during high-slip operation.

5. A hydraulic coupling comprising a runner and an impeller coaxial therewith, the runner and impeller being opposed along a radial plane of separation substantially equidistant from the back wal's thereof and defining a hydraulic circuit of unbalanced proportions with the greater portion of the volume thereof in the runner to accommodate shifting of the fluid during high-slip operation, the radially outer portions of the runner and impeller being substantially symmetrical, and the radially inner portion of the runner being of substantially greater volume than the radially inner portions of the impeller so that the runner accommodates the shifting of fluid thereinto during high-s'ip operation, the runner being conformed to direct fluid discharged along the shell thereof at substantially the said plane of separation in a diverging conical path, and the impeller inlet portion conforming to the direction of said conical path.

MERTON H. BLANK.
GILBERT E. NELSON.

REFERENCES CITED

The following references are of record in the file of this patent:

UNITED STATES PATENTS

| Number | Name | Date |
|---|---|---|
| 2,150,151 | Burrows et al. | Mar. 14, 1939 |
| 2,168,350 | Lapsley | Aug. 8, 1939 |
| 2,270,545 | Neracher et al. | Jan. 20, 1942 |
| 2,299,883 | Dunn | Oct. 27, 1942 |
| 2,334,548 | Greenlee | Nov. 16, 1943 |
| 2,358,473 | Patterson | Sept. 19, 1944 |
| 2,439,630 | Nutt | Apr. 13, 1948 |

Certificate of Correction

Patent No. 2,562,657                                                  July 31, 1951

MERTON H. BLANK ET AL.

It is hereby certified that error appears in the printed specification of the above numbered patent requiring correction as follows:

Column 3, line 39, for "rstrictive" read *restrictive*; line 72, same column and column 4, line 51, for "portions" read *portion*;

and that the said Letters Patent should be read as corrected above, so that the same may conform to the record of the case in the Patent Office.

Signed and sealed this 16th day of October, A. D. 1951.

[SEAL]

THOMAS F. MURPHY,
*Assistant Commissioner of Patents.*